United States Patent [19]
Ojima et al.

[11] Patent Number: 5,782,492
[45] Date of Patent: Jul. 21, 1998

[54] SEAT BELT TIGHTENING DEVICE

[75] Inventors: Juji Ojima, Yokohama; Yoshiharu Kitamura; Kouichi Yamamuro, both of Kanagawa-ken, all of Japan

[73] Assignee: NHK Spring Co., Ltd., Yokohama, Japan

[21] Appl. No.: 555,814

[22] Filed: Nov. 9, 1995

[30] Foreign Application Priority Data

Nov. 11, 1994 [JP] Japan .................................. 6-277901
Jun. 19, 1995 [JP] Japan .................................. 7-151905

[51] Int. Cl.$^6$ ........................................... B60R 22/36
[52] U.S. Cl. ........................................... 280/806; 297/480
[58] Field of Search .......................... 280/801.1, 806; 297/480

[56] References Cited

U.S. PATENT DOCUMENTS 4,705,296  11/1987  Andersson et al. .
4,913,497   4/1990  Knabel et al. .
5,039,127   8/1991  Föhl .

FOREIGN PATENT DOCUMENTS

3822253  1/1990  Germany .................. 280/806
3923724  1/1991  Germany .................. 280/806
4-317839 11/1992  Japan .

Primary Examiner—Eric D. Culbreth
Attorney, Agent, or Firm—Pennie & Edmonds LLP

[57] ABSTRACT

A lock arm is rotatably provided on a base bracket. A ratchet is rotatably disposed on a shaft member provided at an end portion of the lock arm. A distal-end claw portion of the ratchet is shaped to be engageable with reverse motion preventing teeth formed on the base bracket. A stopper wall is provided on a proximal end portion of the lock arm. In the state in which an engaging portion of the trigger lever abuts upon the stopper wall, an end portion of the trigger lever is supported by a movable body. Thereby, the lock arm is held in a normal position. The movable body moves from a first position toward a second position at the time of a collision. A support shaft or the center of rotation of the trigger lever is located on a higher level than a location where the lock arm is engaged with the trigger lever. The movable body is provided with a recess in which the end portion of the trigger lever is put when the movable body has moved from the first position to the second position.

19 Claims, 12 Drawing Sheets

SEAT BELT TIGHTENING DEVICE

BACKGROUND OF THE INVENTION

1. Field of the Invention

The present invention relates to a seat belt tightening device for use in a vehicle seat of, for example, an automobile.

2. Description of the Related Art

In some cases, a seat belt is somewhat loosely set on a vehicle seat in order to eliminate a "fastened" feeling during normal driving. In other cases, a seat belt tightening device called "pretensioner" or "preloader" is used to spontaneously eliminate loosening of the seat beat at the time of a collision.

There are two types of conventional seat belt tightening devices: explosive-type devices and mechanical-type devices. Although the explosive-type device can be quickly actuated, high precision is required in an ignition system or a collision sensor, resulting in complex structure and high cost. On the other hand, the operation speed of the conventional mechanical-type tightening device is low, but this mechanical-type device is advantageous in promoting wider use of seat belt tightening devices, from the standpoint of manufacturing cost, etc.

For example, Jpn. Pat. Appln. KOKAI Publication No. 4-317839 discloses a mechanical tightening device wherein the negative acceleration which is caused by a collision is detected by a mass body, and when the mass body has advanced over a predetermined distance, a trigger mechanism is actuated. Thus, a wire rope is pulled by the force of a compression coil spring, and the seat belt is pulled by the wire rope in such a direction as to eliminate loosening of the seat belt. A ratchet member is engaged with reverse motion preventing teeth. Thereby, the seat belt is fixed and a passenger using the seat belt is tightly held.

In the above prior art, the wire rope is interposed between the mass body and the ratchet member. Since the wire rope itself has some loosening, a considerable time delay occurs between the start of movement of the mass body due to negative acceleration and the pulling of the seat belt. Consequently, the passenger moves forward due to the inertia force of the collision before the loosening of the seat belt is sufficiently eliminated. In addition, in the case of the above prior art, the wire rope needs to be extended via a direction changing mechanism such as an arcuated guide member. Thus, when the wire rope is pulled, a very strong frictional force is produced and the wire rope cannot smoothly moved.

Furthermore, in the prior art in which the wire rope is pulled by the compression coil spring, the degree of compression of the compression coil spring is extremely reduced when the wire rope has been pulled to a maximum near the end of the stroke. Thus, the resiliency of the spring extremely reduces near the end of the stroke, and the force for pulling the wire rope becomes insufficient. In order to solve this problem, a considerably long coil spring is required and the size of the tightening device increases.

Each of the seat belt pretensioners disclosed in U.S. Pat. No. 4,705,296, U.S. Pat. No. 4,913,497 and U.S. Pat. No. 5,039,127 has a complex structure and comprises a great number of parts. Thus, the manufacturing cost thereof is high, and the stable operation is difficult to achieve.

SUMMARY OF THE INVENTION

The object of the present invention is to provide a quickly operable seat belt tightening apparatus which can operate exactly at the time of a collision and has a small size and a simple structure with a small number of parts.

In order to achieve this object, there is provided a seat belt tightening device mounted on a seat belt support structure of a vehicle, the device comprising:

a base bracket fixed on the support structure and having a horizontally extending main shaft;

a lock arm rotatable between a normal position in which the lock arm is set in a higher position and a tightened position in which the lock arm is set in a lower position, with one end portion of the lock arm rotatably centering around the main shaft, the lock arm having a coupling portion to be coupled to a seat belt support member for supporting a seat belt and having a stopper wall extending radially outward of the main shaft;

urging means for producing a torque for rotating the lock arm towards the tightened position;

a movable body provided on the base bracket to be movable between a first position and a second position, the movable body moving from the first position to the second position at a time of a collision;

a horizontal support shaft provided on the base bracket;

a trigger lever being swingable on the support shaft and having an end portion and an engaging portion, a part of the trigger lever which is closer to the end portion being situated between the lock arm and the movable body, the end portion being supported by the movable body when the movable body is in the first position, whereby engagement between the engaging portion and the stopper wall is maintained and the lock arm is set in the normal position, and the end portion ceasing to be supported by the movable body when the movable body has moved to the second position, whereby the engagement between the engaging portion and the stopper wall is released and the lock arm is permitted to rotate towards the tightened position;

reverse motion preventing teeth provided on the base bracket along an arc defined around the main shaft;

a shaft member provided at the other end portion of the lock arm; and a ratchet rotatably provided around the shaft portion and having a distal-end claw portion engageable with the reverse motion preventing teeth, the claw portion being directed rearwards with respect to a rotational direction of the lock arm while the lock arm is being rotated towards the tightened position, and the claw portion being moved in a direction to engage the reverse motion preventing teeth while the lock arm is being rotated towards the normal position.

In the normal running state of the vehicle, the movable body is set in the first position. Thus, the end portion of the trigger lever is supported by the movable body, and the engaging portion of the trigger lever is engaged with the stopper wall of the lock arm. Accordingly, the lock arm is held in the normal position. In case of a collision, a negative acceleration speed exceeding a predetermined value acts on the movable body and the movable body moves towards the second position. As a result, the end portion of the trigger lever ceases to be supported by the movable body and the engaging portion of the trigger lever is disengaged from the stopper wall. Accordingly, the lock arm is quickly rotated by the urging means towards the tightened position.

When the lock arm is thus rotated, the claw portion of the ratchet remains facing rearward with respect to the rotational direction of the lock arm. Thus, the ratchet moves towards the tightened position of the lock arm without being engaged with the reverse motion preventing teeth. The seat belt supporting member is coupled to the lock arm. Thus, when the lock arm has moved to the tightened position, the loose seat belt is tightened and the passenger is held.

When the passenger begins to move forward due to the inertia after the collision and the seat belt is pulled forward, the lock arm is moved in the opposite direction (towards the normal position). Thus, the claw portion of the ratchet moves in a direction to engage the reverse motion preventing teeth and engages the reverse motion preventing teeth. The lock arm is fixed by the engagement between the ratchet and reverse motion preventing teeth. Therefore, the passenger can be held while the seat belt is being tightened.

The seat belt tightening device according to the present invention has a compact size, a simple structure, high operation speed and high operational reliability, unlike a mechanical pretensioner using a wire cable in which loosening of the cable, excessive friction or delay of operation may occur.

If a spiral spring is adopted as means for urging the lock arm, the elastic energy which can be accumulated in the spiral spring is greater than that of a coil spring, etc. Therefore, a great tightening force can be produced over the entire range of rotation of the lock arm.

If the position of the support shaft or the center of rotation of the trigger lever is set off upward from a location where the lock arm is engaged with the trigger lever, the end portion of the trigger lever can be pressed on the movable body by making use of part of the elastic force produced by the urging means itself. With this structure, there is no need to separately provide a spring for urging the trigger lever, resulting in a simpler structure of the device, a smaller number of structural parts and higher operational reliability.

If a projection for preventing excessive rotation of the ratchet is provided on a front portion of the ratchet, such a projection can effectively prevent the ratchet from running over the reverse motion preventing teeth while being engaged with the reverse motion preventing teeth, when a great tensile load is applied from the seat belt side.

Since the end portion of the trigger lever is urged on the upper surface of the movable body by the torque producing spring provided separately from the urging means or the urging means itself, the movable body can be prevented from moving forward due to vibration, etc. during the driving of the vehicle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

An embodiment of the present invention will now be described with reference to FIGS. 1 to 8.

Figure 1:
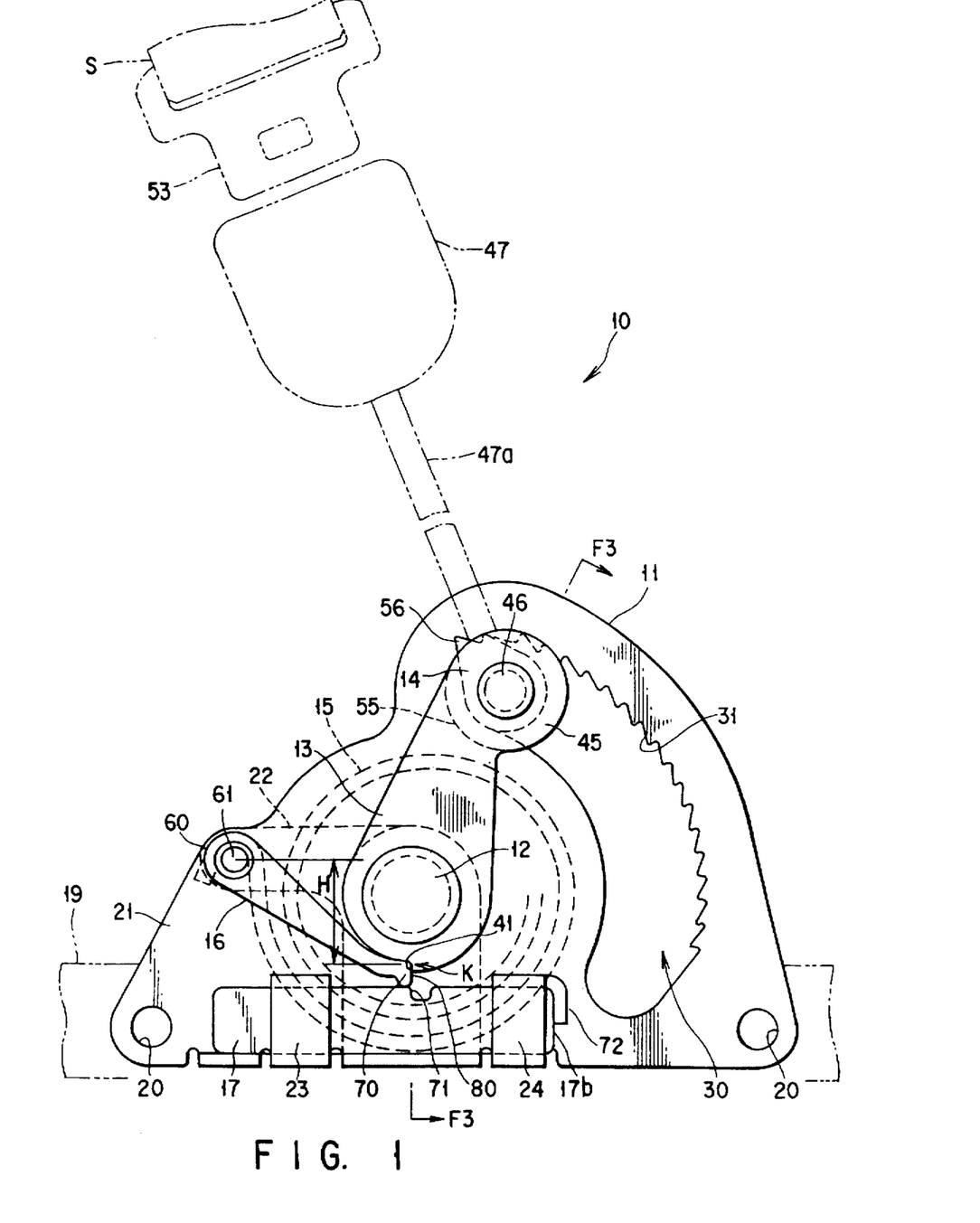
FIG. 1 is a side view showing a seat belt tightening device according to an embodiment of the present invention.

FIG. 1 shows a seat belt tightening device 10 comprising a base bracket 11, a horizontal main shaft 12 rotatably provided on the base bracket 11, a lock arm 13 fixed to the main shaft 12, a ratchet 14 provided on the lock arm 13, a torsion spring 15 wound around the main shaft 12, a trigger lever 16 and a movable body 17.

Figure 2:
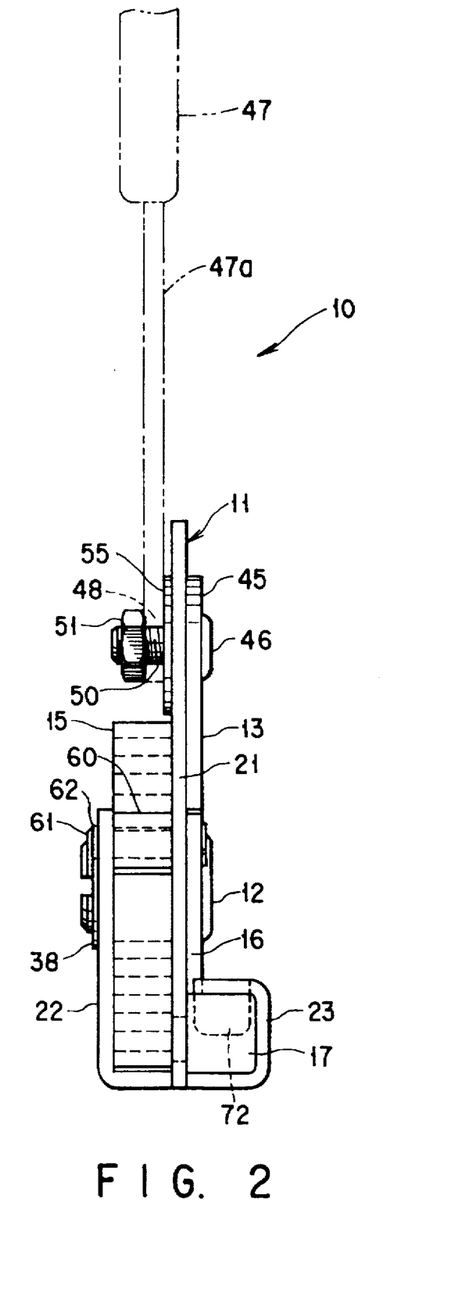
FIG. 2 is a front view of the tightening device shown in FIG. 1.

The base bracket 11 is fixed to a seat belt support structure 19, e.g. the body or seat frame of a vehicle such as an automobile. For the purpose of the fixation, holes 20 for insertion of fixing bolts (not shown), etc. are formed in the base bracket 11. The base bracket 11 is a pressed product of a thick steel plate. The base bracket 11 comprises, as shown in FIG. 2, a vertically raised main frame portion 21, a sub-frame portion 22 raised in an L-shape from a bottom portion of the main frame portion 21 to the left, and a pair of front and rear movable body holders 23 and 24 bent in a bracket ([) shape to the right of the main frame portion 21.

An elongated hole (arcuated slit) 30 is formed in the main frame portion 21 so as to extend along an arc defined around the center of the main shaft 12. Reverse motion preventing teeth 31, which are similar to sawteeth, are formed on that part of an inner peripheral portion of the main frame portion 21 defining the slit 30, which is located farther from the main shaft 12. The reverse motion preventing teeth 31 extend along the longitudinal direction of the slit 30. The reverse motion preventing teeth 31 are shaped to be engageable with a distal-end claw portion 56 of the ratchet 14. The teeth 31 can surely prevent the ratchet 14 from being moved in a direction of arrow R in FIG. 8 when a force acting in the direction of arrow R urges the ratchet 14.

Figure 3:
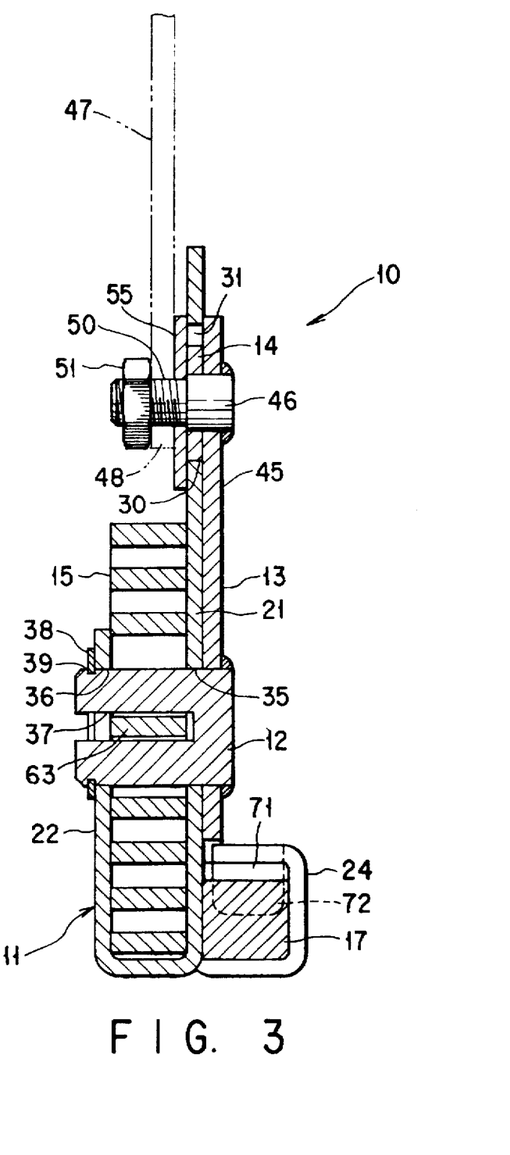
FIG. 3 is a cross-sectional view taken along line F3—F3 in FIG. 1.

As is shown in FIG. 3, the main shaft 12 is rotatably supported by the base bracket 11 such that the main shaft 12 is inserted in a bearing bore 35 formed in the main frame 21 and a bearing bore 36 formed in the sub-frame portion 22. A lock arm 13 is fixed to one end portion of the main shaft 12 by means of welding, etc. A slit 37 and an annular groove 39 for mounting of a circlip such as a C-ring are formed in the other end portion of the main shaft 12. The circlip 38 prevents the main shaft 12 from being removed from the bearing bores 35 and 36.

A stopper wall 41 is provided on a bottom surface of a proximal portion of the lock arm 13. The stopper wall 41 projects radially outward of the main shaft 12 and faces an engaging portion 80 (mentioned below) of the trigger lever 16. A shaft member 46 is fixed to an end portion 45 of the lock arm 13 by means of welding, etc. A lower end portion 48 of a leg portion 47a of a buckle 47 or a member for supporting the seat belt S, is fixed to the shaft member 46. In the case of this example, the shaft member 46 is inserted in a hole 50 formed in the lower end portion 48 of the seat belt support member 47, and the support member 47 is fixed by a nut 51. The support member (buckle) 47 can be coupled to a coupling tongue 53 of the seat belt S.

The ratchet 14 is rotatably attached to the shaft member 46. The ratchet 14 is interposed between the lock arm 13 and a plate 55 and contained in the arcuated hole 30. In addition, as shown in FIG. 1, the claw portion 56 of ratchet 14 contained in the hole 30 is directed toward the upper end side of the hole 30 (i.e. toward the seat belt support member 47).

Figure 6:
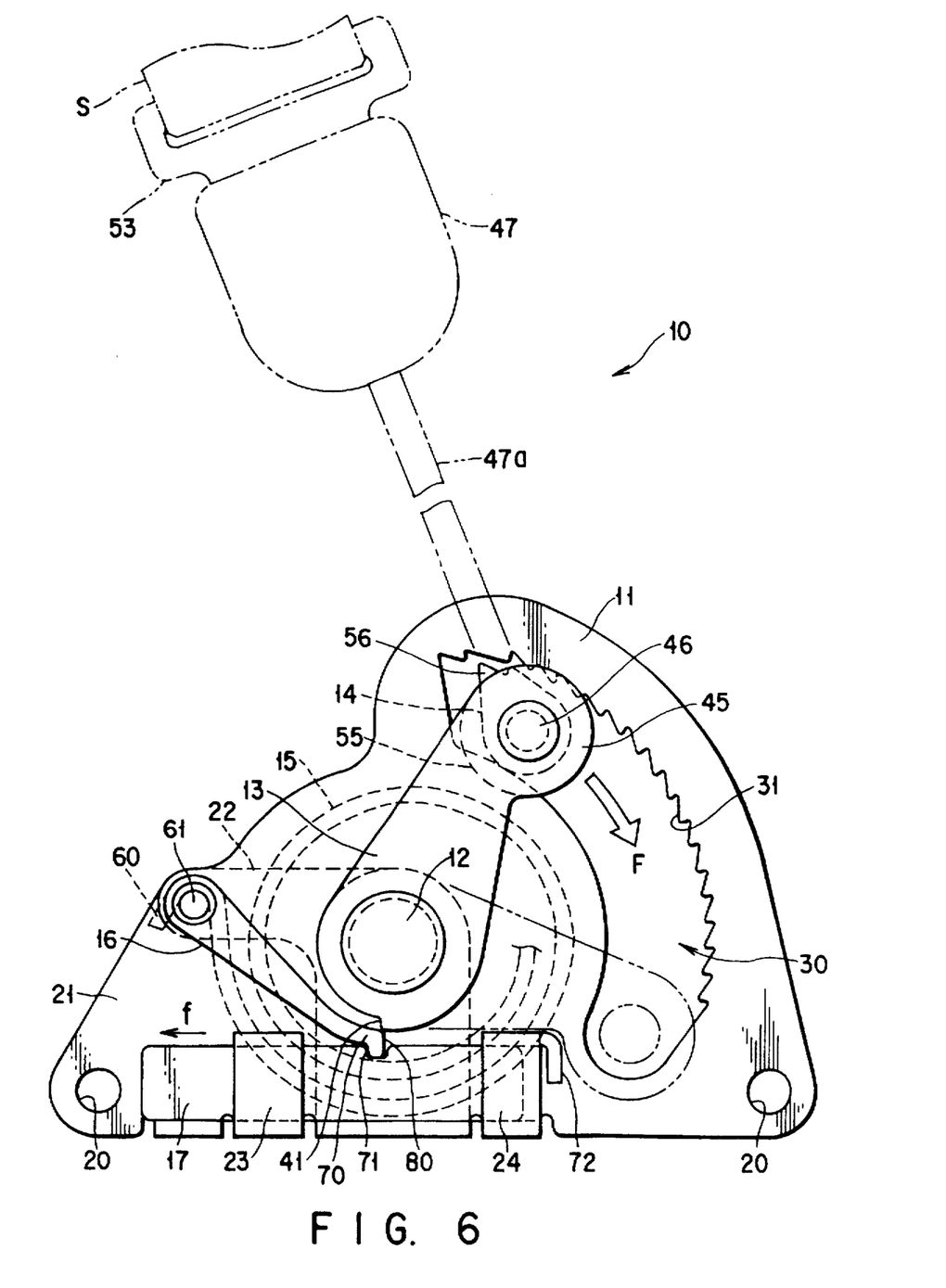
FIG. 6 is a side view illustrating the operating state of the tightening device shown in FIG. 1.
Figure 7:
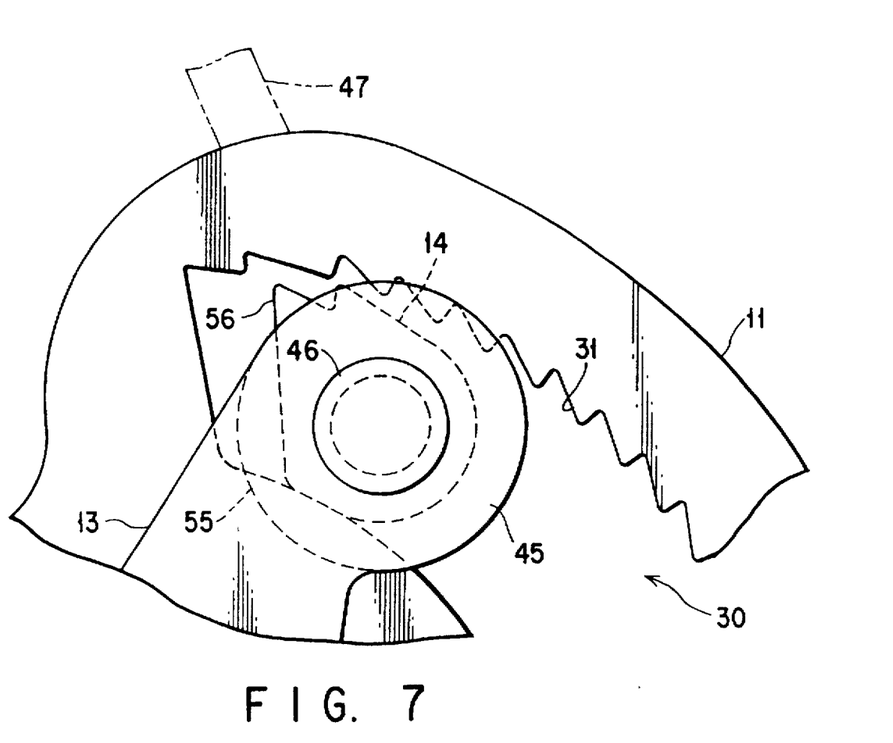
FIG. 7 is an enlarged view of a part of the tightening device shown in FIG. 1, illustrating the operating state of the device.

Since the ratchet 14 is movable within the arcuated hole 30 along the arc of the hole 30, the lock arm 13 is rotatable from a normal position where the lock arm 13 is raised, as shown in FIG. 1, to a tightened position where the arm 13 is brought down rearwards, as shown in FIG. 6 by two-dot-and-dash lines. The ratchet 14 is formed of heat-treated steel. The center of gravity of the ratchet 14 departs from the center of the shaft member 46 towards the claw portion 56. While the lock arm 13 is being rotated from the normal position to the tightened position, the claw portion 56 is directed rearward with respect to the rotational direction.

An example of the torsion spring 15 functioning as urging means is a spiral spring. The spiral spring 15, as compared to a coil spring, can have a large degree of deflection under in a predetermined range of a load and thus the elastic energy which can be accumulated is large. Accordingly, the spiral spring 15 is suitable as compact urging means which needs to urge the lock arm 13 over a long rotational stroke.

In addition to the spring 15, any type of means for producing a torque due to a repulsive load, such as a torsion bar or a torsion coil spring, can be used as the urging means. The spring 15, for example, has such a spring constant as to produce a torque of about 100 kgf in the normal position as shown in FIG. 1.

Figure 4:
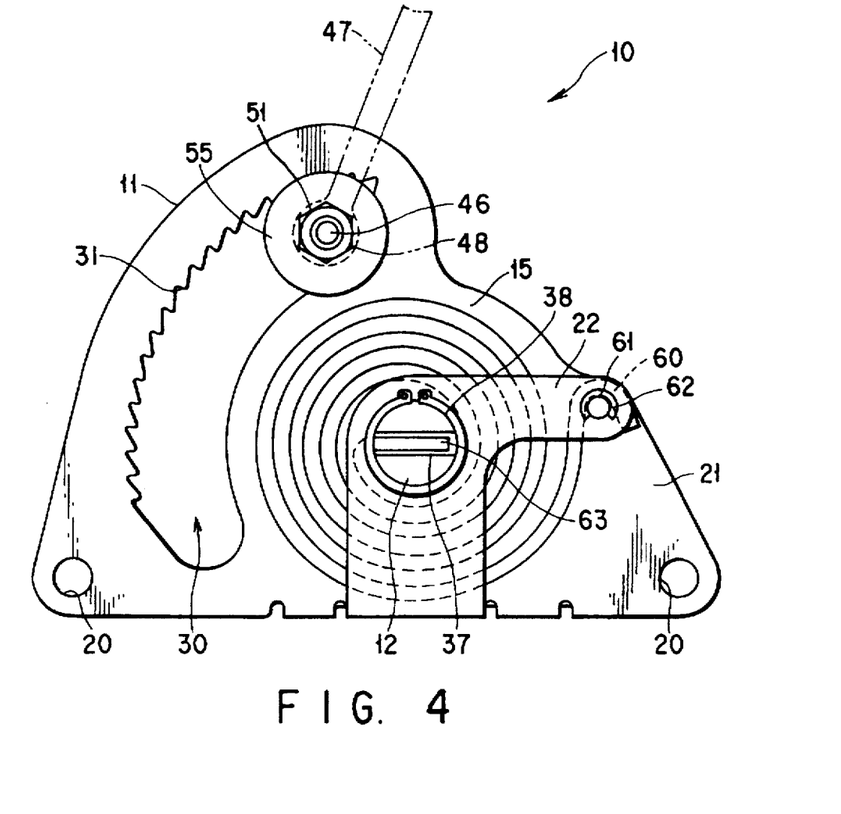
FIG. 4 is a side view of the tightening device shown in FIG. 1, as viewed from the opposite side.

An outer peripheral end portion 60 of the spiral spring 15 as shown in the figures is engaged with a support shaft 61 serving as spring receiver. The support shaft 61 is passed through the main frame portion 21 and sub-frame portion 22, and removal of the support shaft 61 is prevented by a circlip 62. As shown in FIG. 4, etc., an inner peripheral end portion 63 of the torsion spring 15 is fixed to the main shaft 12 such that it is inserted in a slit 37 in the main shaft 12.

Accordingly, when the lock arm 13 is rotated in a direction of arrow F in FIG. 6 (i.e. a direction towards the tightened position), the torsion spring 15 produces a torque. In addition, the torsion spring 15 is engaged with the slit 37 in the main shaft 12 and the support shaft 61 in the state in which the torsion spring 15 is fully wound up, so that the torsion spring 15 retains a sufficient repulsive load for strongly pulling the seat belt support member 47 even when the lock arm 13 has been rotated near to the tightened position.

The movable body 17 functioning as mass body is formed of a material with a relatively great specific gravity, such as lead or iron. The movable body 17 is held by the holders 23 and 24 such that it can move from a first position shown in FIG. 1 to a second position, i.e. a forward position in the direction of movement of the vehicle. The movable body 17 as shown in the figures has a substantially rectangular-parallelepipedic shape. A recess 71 with such a size that an end portion 70 of the trigger lever 16 is formed in a top surface of the movable body 17.

A portion of the base bracket 11 is bent to form a stopper 72. The stopper 72 is situated to face a rear end portion 17b of the movable body 17. The stopper 72 limits the rearward position of the movable body 17. The movable body 17 can be set in the first position shown in FIG. 1 by a proper elastic member on an as-needed basis.

The trigger lever 16 is rotatably supported by the horizontal support shaft 61 provided in the base bracket 11. As is shown in FIG. 1, the center of the support shaft 61 is set off by a distance H upwards from a location K at which the stopper wall 41 of the lock arm 13 is engaged with the engaging portion 80 of the trigger lever 16. The end portion 70 of the trigger lever 16 extends towards the lower surface of the proximal portion of the lock arm 13 and can come into contact with the upper surface of the movable body 17.

The engaging portion 80 of the trigger lever 16 faces the stopper wall 41 of the lock arm 13. In the state in which the end portion 70 of the trigger lever 16 is supported on the upper surface of the movable body 17, the engaging portion 80 is put in contact with the stopper wall 41. Thereby, the lock arm 13 is held in the normal position.

Figure 5:
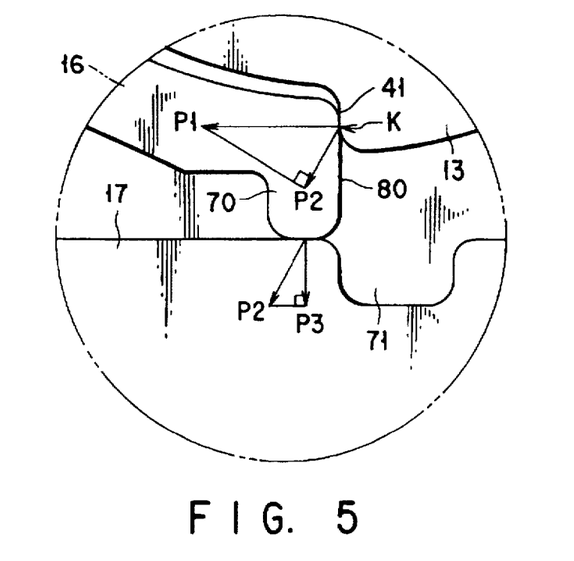
FIG. 5 is an enlarged view of a region near the end portion of a trigger lever of the tightening device shown in FIG. 1.

As shown in the enlarged view of FIG. 5, when the stopper wall 41 is pushed onto the engaging portion 80 of the trigger lever 16 by the torque of the torsion spring 15 under a load P1, a component force P2 acting in the rotational direction of the trigger lever 16 and a component force P3 acting in the vertical direction to the movable body 17 are produced at a location K where the stopper wall 41 is engaged with the engaging portion 80. Since the component force P3 is produced, part of the elastic energy of the torsion spring 15 can be used as means for urging the end portion 70 of the trigger lever 16 onto the movable body 17. In this case, a spring for urging the trigger lever 16 is not needed as a separate member. Thus, the number of parts can be reduced and the operational reliability can be enhanced. If necessary, the end portion 70 of the trigger lever 16 can be urged onto the movable body 17 by means of an auxiliary spring (not shown) or the like.

Since the end portion 70 of the trigger lever 16 holds the movable body 17, as described above, the movable body 17 does not move forward at the time of deceleration during normal driving or at the time of driving on a slope. A provisional stopper such as a shallow recess for receiving a lower end portion of the end portion 70 of the trigger lever 16 may be formed in the upper surface of the movable body 17, whereby the movable body 17 can be held in a predetermined position (the first position) by a force of a certain strength.

In the seat belt tightening device 10 with the above structure, the movable body 17 is set in the first position shown in FIG. 1 and the engaging portion 80 of the trigger lever 16 is engaged with the stopper wall 41 at the time of normal driving. Thus, the lock arm 13 is held in the normal position. In case of a collision, a negative acceleration speed exceeding a predetermined value acts on the movable body 17 and the movable body 17 moves forward (in the direction of arrow f), as shown in FIG. 6. As a result, the end portion 70 of the trigger lever 16 enters the recess 71 in the movable body 17.

Accordingly, the engaging portion 80 of the trigger lever 16 is disengaged from the stopper wall 41, and the lock arm 13 is quickly rotated downward in the direction towards the tightened position (in the direction of arrow F) by the resilient force of the torsion spring 15. Since the center of gravity of the ratchet 14 departs from the shaft member 46 toward the distal-end claw portion 56, the claw portion 56 remains facing rearward with respect to the rotational direction of the lock arm 13 even while the lock arm 13 is quickly rotated in the direction of arrow F. The claw portion 56 moves in the direction of arrow F without being hooked on the reverse motion preventing teeth 31. Thus, the seat belt support member 47 is strongly pulled and the loose seat belt S is tightened. Accordingly, the passenger is held.

Figure 8:
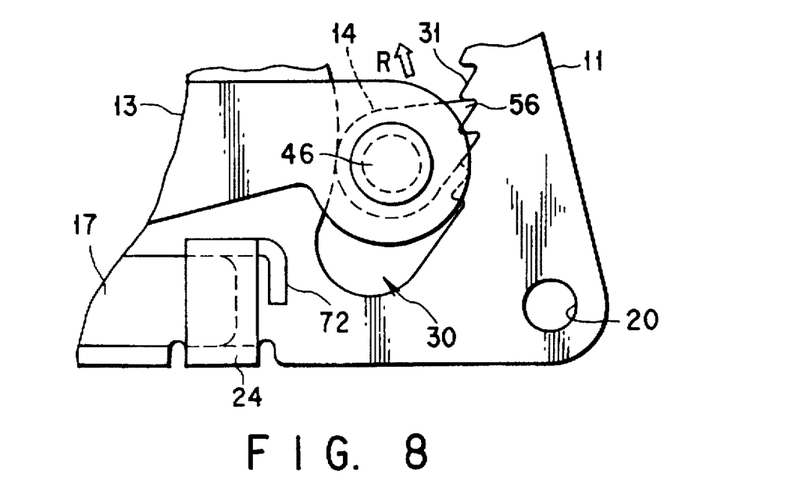
FIG. 8 is a side view of a part of the tightening device shown in FIG. 1, illustrating the engaged state of a ratchet and reverse motion preventing teeth.

When the passenger begins to move forward due to the inertia after the collision, the seat belt S is pulled and the lock arm 13 is moved in the opposite direction (the direction of arrow R in FIG. 8). By virtue of the centrifugal force of the ratchet 14 produced at this time, the claw portion 56 of the ratchet 14 is instantaneously rotated towards the reverse motion preventing teeth 31 and the ratchet 14 is engaged with the reverse motion prevention teeth 31. Thereby, further rotation of the lock arm 13 in the direction of arrow R is prevented and the seat belt support member 47 is fixed. Thus, the passenger is held while the seat belt is being tightened.

Figure 9:
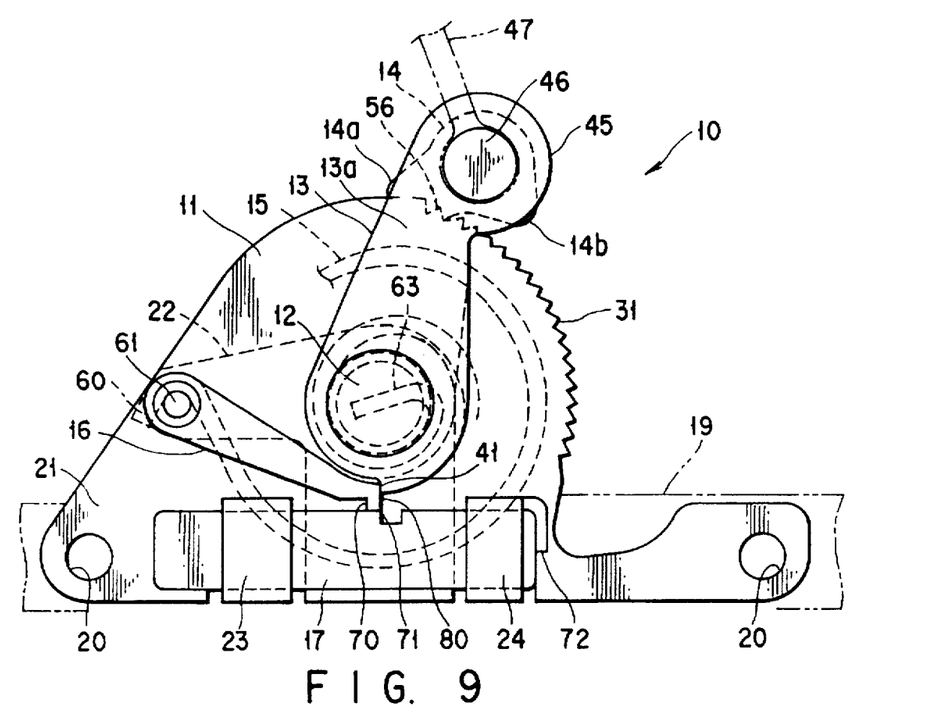
FIG. 9 is a side view showing a seat belt tightening device according to another embodiment of the invention.
Figure 10:
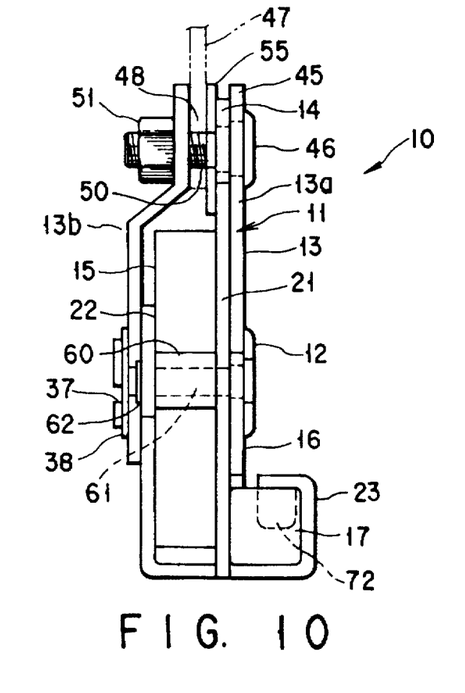
FIG. 10 is a front view of the tightening device shown in FIG. 9.
Figure 11:
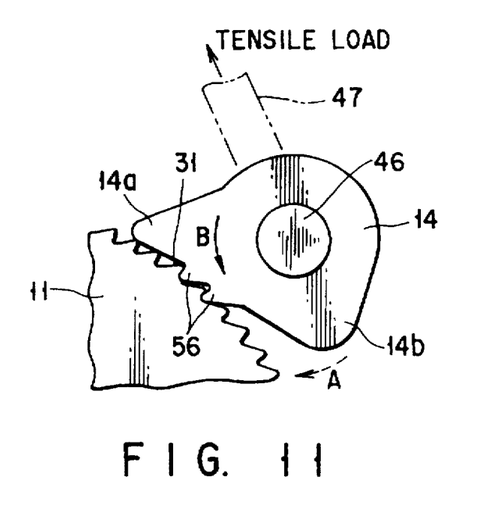
FIG. 11 is an enlarged view showing parts of a ratchet and reverse motion preventing teeth of the tightening device shown in FIG. 9.

FIGS. 9 to 11 show another embodiment of the present invention. This embodiment differs from the preceding embodiment with respect to the base bracket 11, lock arm 13 and ratchet 14, as will be described below. Since the structure and operation of the other parts are the same, the common parts are denoted by like reference numerals and a description thereof is omitted.

As is shown in FIG. 9, reverse rotation preventing teeth 31 are provided on the outer peripheral portion of a base bracket 11 along an arc defined around the main shaft 12. As is shown in FIG. 10, the lock arm 13 comprises a main arm 13a located on the right side and a sub-arm 13b located on the left side. The main arm 13a and sub-arm 13b are situated substantially parallel to each other. Proximal end portions of the main arm 13a and sub-arm 13b are fixed to the main shaft 12. A shaft member 46 for fixing the seat belt support member 47 is provided at distal end portions of the main arm 13a and sub-arm 13b.

In this embodiment (FIGS. 9 to 11), since both end portions of the shaft member 46 are supported by the main arm 13a and sub-arm 13b, the strength of the shaft member 46 is increased. In addition, even if a great tensile load is applied from the seat belt support member 47 to the shaft member 46 and lock arm 13, it is possible to prevent a bending force from acting on the shaft member 46 and lock arm 13. Therefore, the strength of the shaft member 46 and lock arm 13 can be increased effectively.

As is shown in FIG. 11, a projection 14a is provided on a front portion of the ratchet 14 in order to prevent the ratchet 14 from rotating excessively. A projection 14b is also provided on a rear portion of the ratchet 14. When the trigger lever 16 is disengaged from the movable body 17 at the time of a collision and the lock arm 13 is rotated toward the tightened position by the resilient force of the spring 15, the projection 14b prevents the ratchet 14 from rotating excessively in the direction of arrow A.

When the passenger begins to move forward after a predetermined time period has passed from the time point of the collision, the seat belt support member 47 is strongly pulled forward. In this case, the claw portion 56 is urged to move further forward while it is engaged with the reverse motion preventing teeth 31. However, the front-side projection 14a prevents the ratchet 14 from rotating over the reverse motion preventing teeth 31 (in the direction of arrow B).

Figure 12:
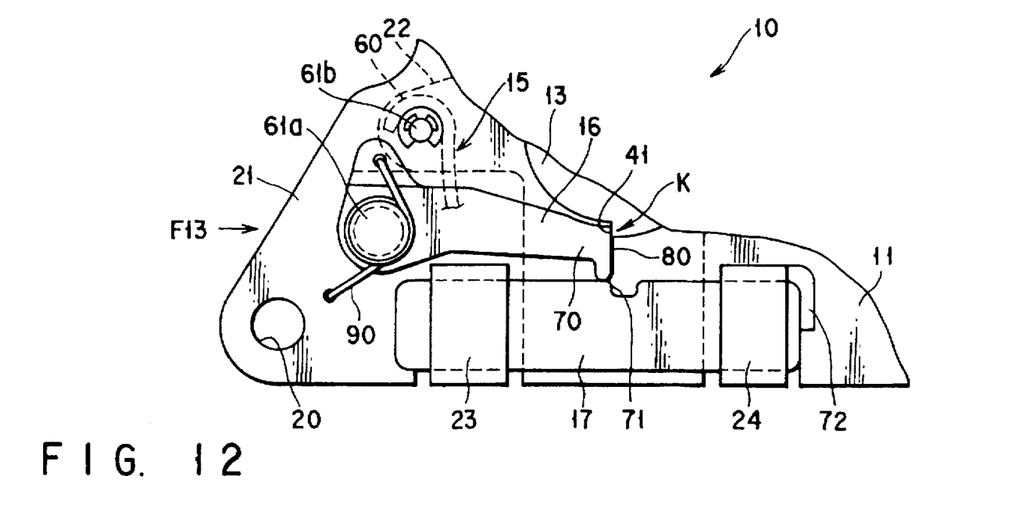
FIG. 12 is a side view of a part of a sheet belt tightening device according to a modification in which a torsion spring is provided on the trigger lever.
Figure 13:
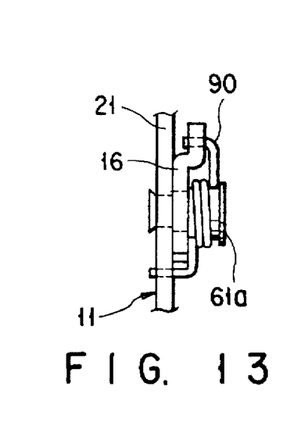
FIG. 13 is a front view of a part of the device shown in FIG. 12, as viewed in the direction of arrow F13 in FIG. 12.

FIGS. 12 and 13 shows a modification of the trigger lever 16. A torque producing spring 90 such as a torsion spring constantly urges an end portion 70 of the trigger lever 16 toward the movable member 17. A proximal end portion of the trigger lever 16 is rotatably supported by a support shaft 61a provided on the base bracket 11. In this modification, the end portion 70 can be pressed on the movable body 17 even if the center of rotation (i.e. support shaft 61a) of the trigger lever 16 is not set off above from the location K where the lock arm 13 is engaged with the trigger lever 16.

In other words, in this modification, the support shaft 61a of the trigger lever 16 can be located on the same level as the engagement location K or on a lower level than the engagement location K. Therefore, the degree of freedom of layout of the trigger lever 16 is increased. In the modification as shown, the outer end portion 60 of the torsion spring 15 is engaged with a shaft 61b which is provided at a location different from the location of the support shaft 61a of the trigger lever 16. The structure, operation and advantage of the other structural parts are substantially the same as those of the preceding embodiment (FIGS. 1 to 8). Accordingly, the parts common to those of the preceding embodiment are denoted by like reference numerals and a description thereof is omitted.

Figure 14:
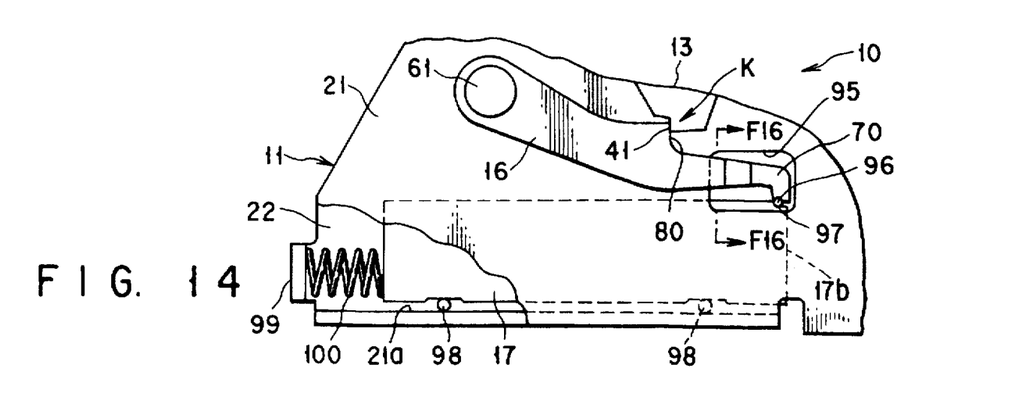
FIG. 14 is a side view of a part of a seat belt tightening device according to an example in which a movable body is provided within a base bracket.
Figure 15:
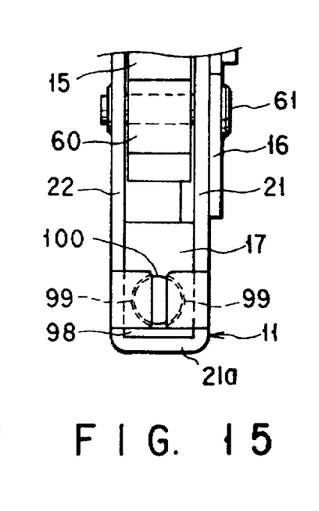
FIG. 15 is a front view of a part of the tightening device shown in FIG. 14.
Figure 16:
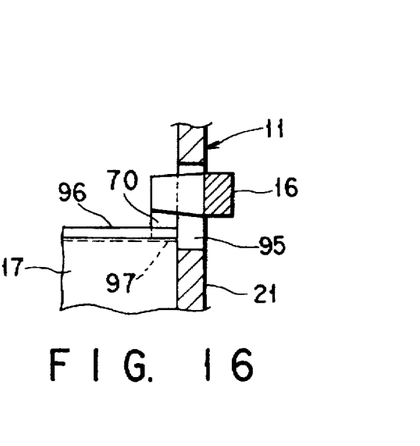
FIG. 16 is a cross-sectional view taken along line F16—F16 in FIG. 14.

FIGS. 14 to 16 show another embodiment of the invention. In this embodiment, a movable body 17 is housed in a bottom part of a base bracket 11, whereby the thickness of the apparatus 10 can be reduced. The base bracket 11 of this embodiment has a double frame structure including a main frame 21 and a sub-frame 22 raised substantially in parallel to the main frame 21. The movable body 17 is housed between a lower part of the main frame 21 and a lower part of the sub-frame 22.

In this case, a trigger lever 16 is situated outside the base bracket 11, like the preceding embodiment. Thus, as shown in FIG. 16, etc., a through-hole 95 is formed in the base bracket 11 and an end portion 70 of the trigger lever 16 passes through the through-hole 95 and projects into the inside of the base bracket 11. In addition, the end portion 70 is located on the upper side of the movable body 17. A rotatable roller 96 is provided between the end portion 70 and movable body 17 so that the movable body 17 can be easily disengaged from the end portion 70 at the time of a collision (i.e. when a sudden deceleration occurs to move the movable body 17 forward). The roller 96 is placed in a recess 97 formed in an upper corner surface portion of the movable body 17 near a rear end 17b thereof.

In the example shown in FIG. 14, rotatable rollers 98 are provided between a lower surface of the movable body 17 and an inner bottom surface 21a of the main frame 21, thereby enhancing the operational responsiveness of the movable body 17 at the time of a collision. In this example, in order to prevent the movable body 17 from moving forward at times other than the time of a collision, a coil spring 100 in the compressed state is provided between a front surface of the movable body 17 and a spring receiver 99 of the base bracket 11. The spring 100 constantly urges the movable body 17 rearwards, thereby keeping the movable body 17 in a predetermined position (first position) at times other than the time of collision.

Figure 17:
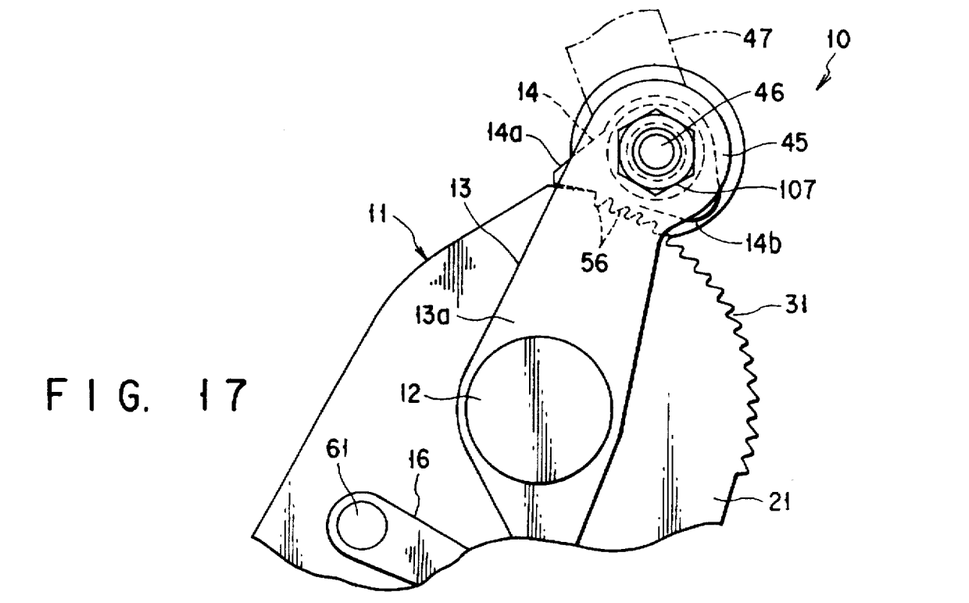
FIG. 17 is a side view of a part of a seat belt tightening device in which a modified ratchet is provided.
Figure 18:
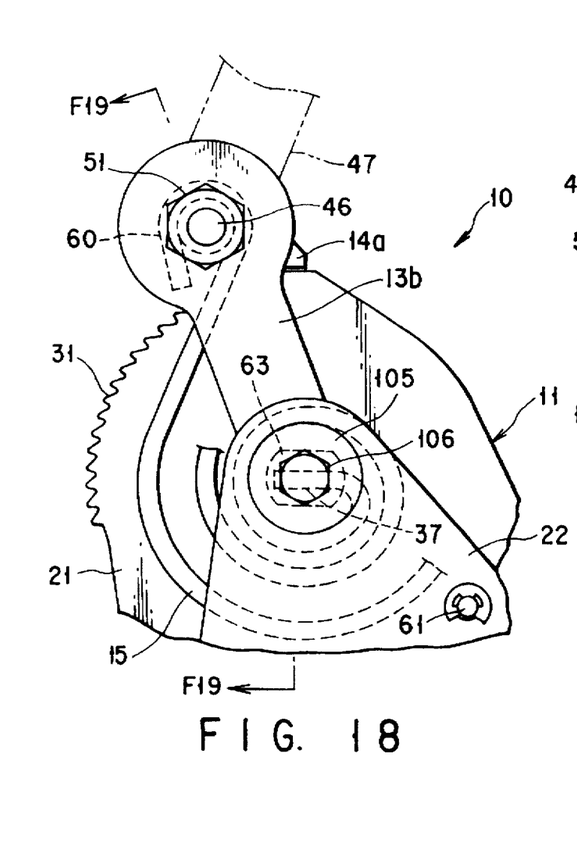
FIG. 18 is a side view of a part of the tightening device shown in FIG. 17, as viewed from the opposite side.
Figure 19:
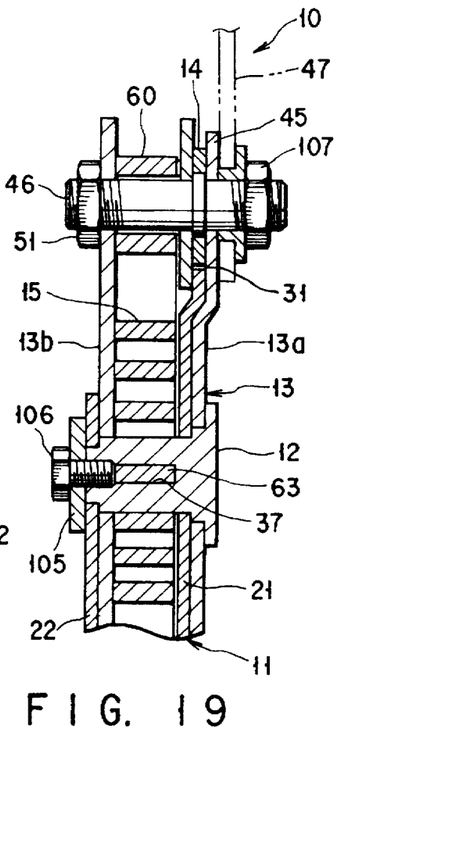
FIG. 19 is a cross-sectional view taken along line F19—F19 in FIG. 18.

FIGS. 17 to 19 show an embodiment of the invention wherein the main shaft 12 is fixed to the base bracket 11 and the lock arm 13 is rotatable relative to the main shaft 12. The outer end portion 60 of the torsion spring 15 is engaged with the shaft member 46 for fixing the seat belt support member 47. The inner end portion 63 of the torsion spring 15 is inserted in the slit 37 in the main shaft 12 and fixed to the main shaft 12 by means of a washer 105 and a bolt 106. Thus, the lock arm 13 is urged by the torsion spring 15 counterclockwise in FIG. 18.

Furthermore, in this embodiment (FIGS. 17 to 19), the lock arm 13 has a double plate structure including a main arm 13a located on the right side in FIG. 19 and a sub-arm 13b located on the left side. The main arm 13a and sub-arm 13b are substantially parallel to each other. A shaft member 46 for fixing the seat belt support member 47 is fixed to distal end portions of the main arm 13a and sub-arm 13b by means of a nut 107. The strength of the lock arm 13 is high since the two arms 13a and 13b support the tensile load of the seat belt support member 47. The structural elements common to those in the above-described embodiment (FIG. 9) are denoted by like reference numerals and a description thereof is omitted.

Figure 20:
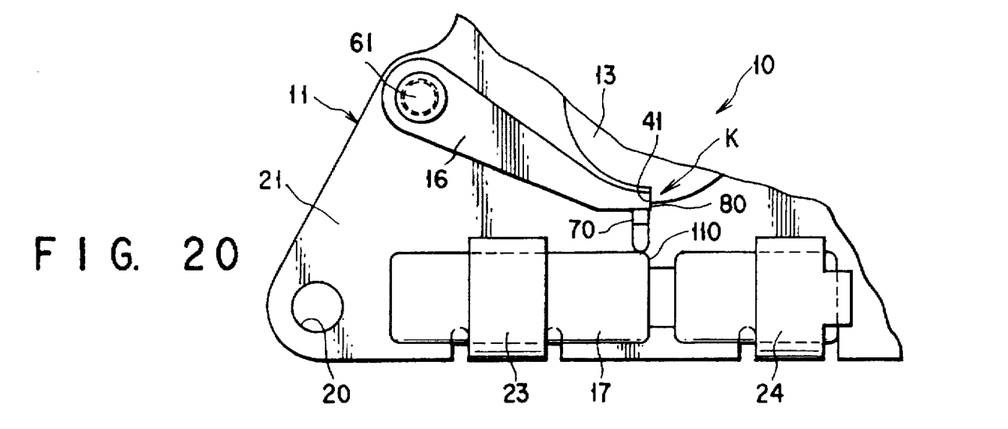
FIG. 20 is a side view of a part of a seat belt tightening device in which a modified movable body is provided.
Figure 21:
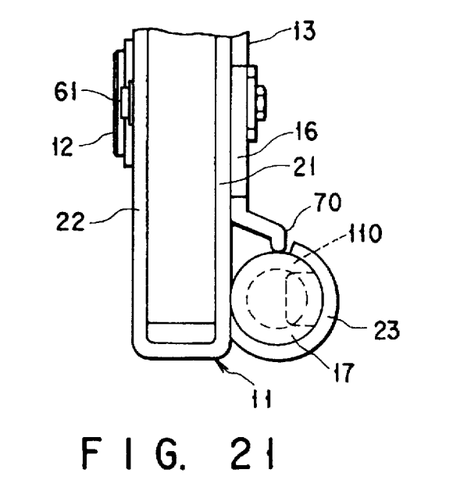
FIG. 21 is a front view of a part of the tightening device shown in FIG. 20.

A movable body 17 shown in FIGS. 20 and 21 is formed in a cylindrical shape for the purpose of easier machining. A circumferentially continuous groove 110 is formed in a longitudinal middle portion of the movable body 17. An end portion 70 of the trigger lever 16 is put in contact with a front-side upper end portion of the groove 110. In this case, the groove 110 and the outer peripheral surface of the movable body 17 can be easily machined. The structural elements common to those in the preceding embodiment (FIGS. 1 to 9) are denoted by like reference numerals and a description thereof is omitted.

Figure 22:
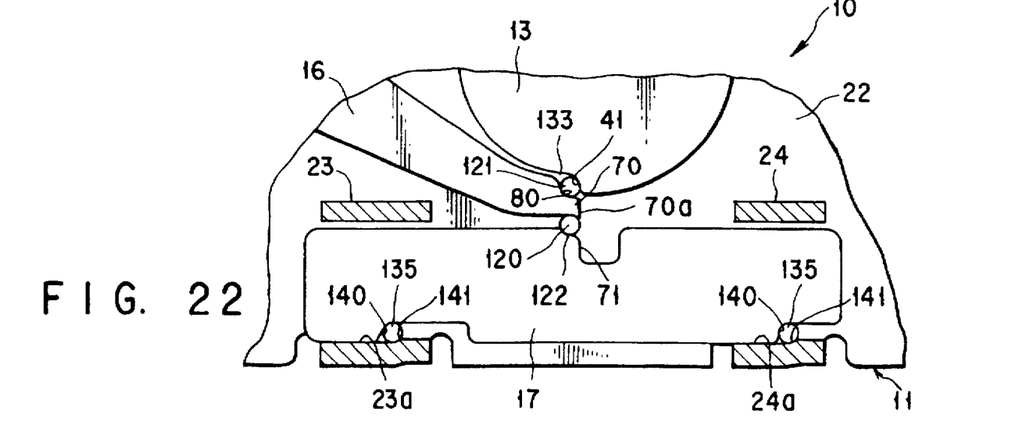
FIG. 22 is a cross-sectional view of a part of a seat belt tightening device according to an example in which a roller is provided at an end portion of the trigger lever.
Figure 23:
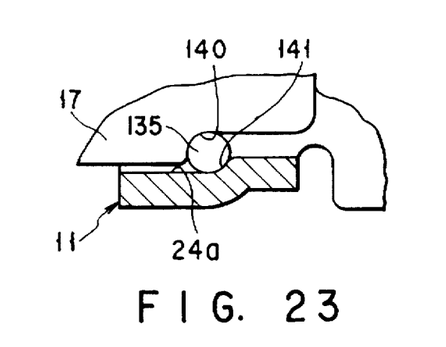
FIG. 23 is an enlarged cross-sectional view showing a part of the tightening device shown in FIG. 22.

In an embodiment shown in FIGS. 22 and 23, a rotatable roller 120 is provided between the end portion 70 of the trigger lever 16 and the movable body 17. A rotatable roller 121 is provided between the end portion 70 of the trigger lever 16 and the stopper wall 41 of the lock arm 13. A shallow recess 122 is formed on a front-side edge portion of the recess 71 in the movable body 17. The roller 120 is put in the shallow recess 122. In addition, a terminal portion 70a of the end portion 70 is slightly projected in an arcuated shape on the rear side of the roller 120, thereby holding the roller 120 and preventing the roller 120 from moving rearwards beyond the terminal portion 70a. A gap 133 for permitting the end portion 70 of the lever 16 to rise slightly is provided between the trigger lever 16 and lock arm 13.

Furthermore, rotatable rollers 135 are provided between the lower surface of the movable body 17 and inner bottom surfaces 23a and 24a of the holders 23 and 24. The rollers 135 function to make the forward movement of the movable body 17 smoother at the time of a collision (i.e. when a sudden deceleration occurs to move the movable body 17 forwards). As shown in the enlarged view of FIG. 23, the roller 135 is interposed between a notch-like stepped portion 140 formed in a lower surface portion of the movable body 17 and a projection-like stepped portion 141 formed on a bottom surface 24a of the movable body holder 24. By virtue of the rollers 120, 121 and 135, the operational responsiveness of the movable body 17 and trigger lever 16 to the negative acceleration speed at the time of collision can be enhanced. The stepped portions 140 and 141 function as backward motion preventing means for preventing the movable body 17 from moving backwards from the first position.

Figure 24:
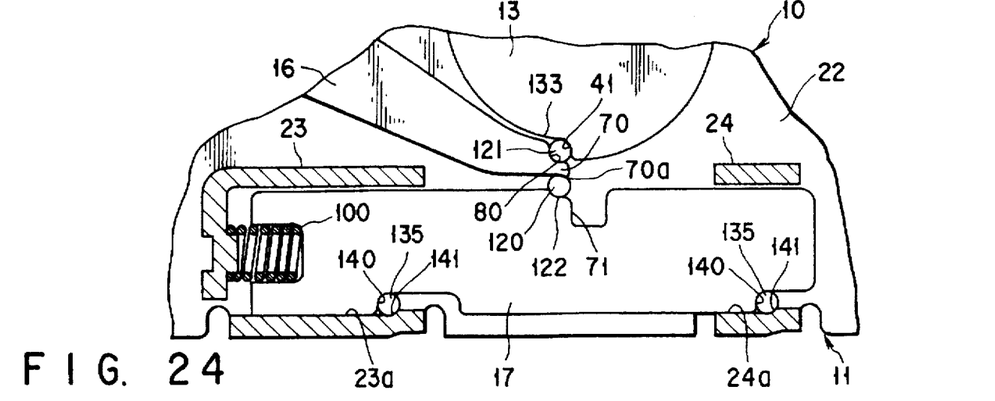
FIG. 24 is a cross-sectional view showing a part of a tightening device according to a modification in which a coil spring is provided on the movable body.

As is shown in FIG. 24, a spring 100 similar to the spring described in the preceding embodiment (FIG. 14) for urging the movable body 17 rearwards may be provided on the front side of the movable body 17, thereby to prevent the movable body 17 from moving forwards at times other than the time of collision.

Figure 25:
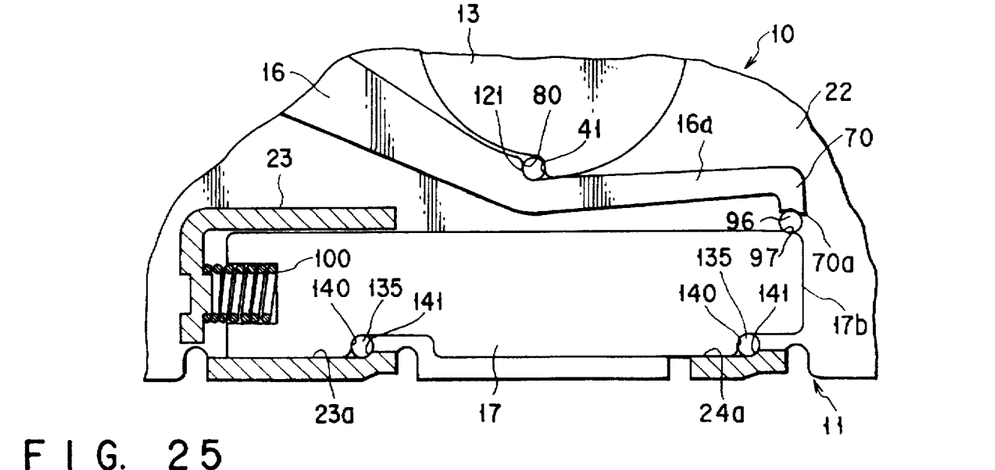
FIG. 25 is a cross-sectional view showing a modification of the trigger lever.

In a modification of the trigger lever 16 shown in FIG. 25, an extended portion 16a is provided on a distal-end side portion of the trigger lever 16. An end portion 70 of the extended portion 16a reaches the vicinity of a rear end portion 17b of the movable body 17. Like the embodiment shown in FIG. 14, the roller 96 is placed in the shallow recess 97 provided near the rear end portion 17b of the movable body 17, and the end portion 70 of the trigger lever 16 is placed on the roller 96. In addition, since a terminal portion 70a of the end portion 70 of the lever 16 projects downwards in rear of the roller 96, the roller 96 is prevented from moving rearwards beyond the terminal portion 70a. In this structure, when the movable body 17 has moved from the first position to the second position, the end portion 70 falls behind the rear end portion 17b of the movable body 17. In this case, even if the dimension of the movable body 17 in the back-and-forth direction is increased, machining for forming the recess 71, as shown in FIG. 22, is not needed and the machining cost is reduced.

Figure 26:
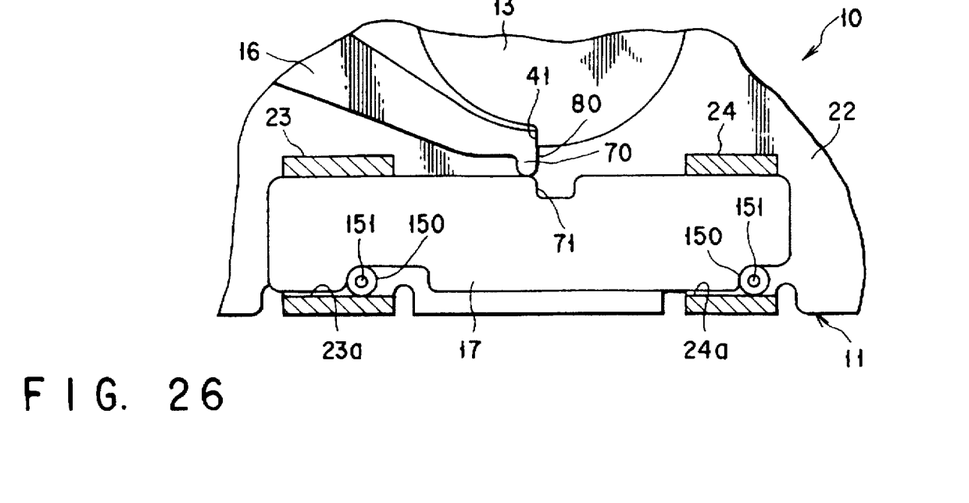
FIG. 26 is a cross-sectional view of a part of a tightening device according to an example in which the movable body is supported by wheel-like rollers.

In an embodiment shown in FIG. 26, wheel-like rollers 150 are rotatably provided on the base bracket 11 by means of shafts 151. Since the movable body 17 is movably supported on bottom surfaces 23a and 24a of the holders 23 and 24 by means of the rollers 150, the movable body 17 is easier to move forward at the time of a collision.

Figure 27:
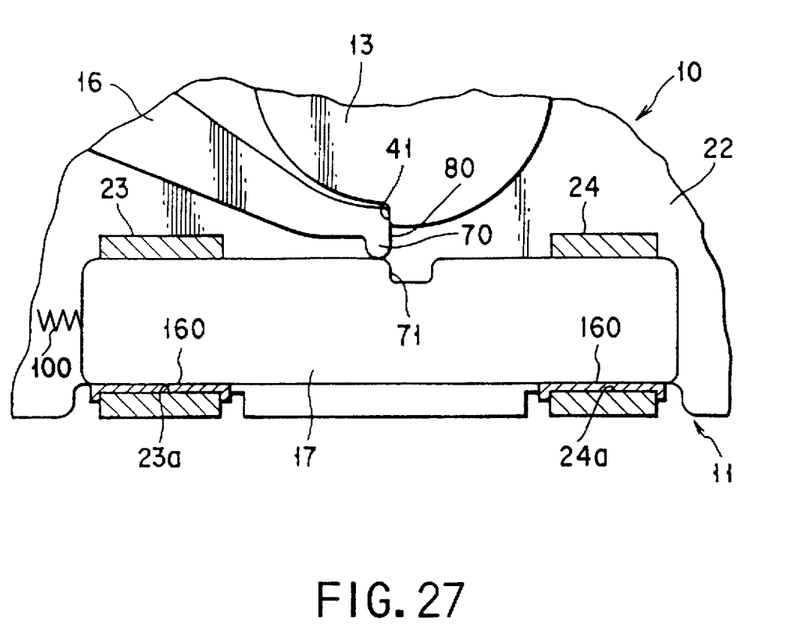
FIG. 27 is a cross-sectional view showing a part of a tightening device according to an example in which the movable body is supported by low frictional members.

In an embodiment shown in FIG. 27, sheet-like low-frictional members 160 formed of a synthetic resin with a low friction coefficient, such as fluororesin, are provided on the bottom surfaces 23a and 24a of the holders 23 and 24 which are put in contact with the lower surface of the movable body 17. The low-frictional members 160 make the forward movement of the movable body 17 easier at the time of a collision. A spring shown schematically at 100 is provided for urging the movable body backwards.

Figure 28:
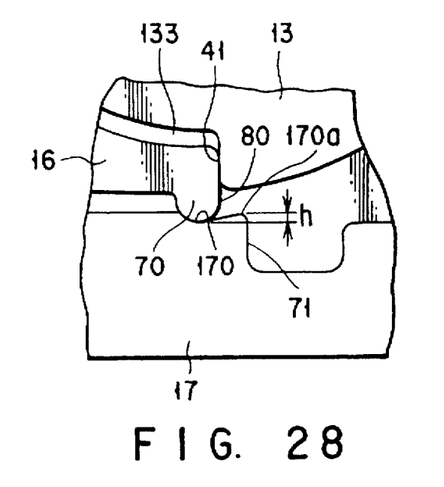
FIG. 28 is a side view showing a modification in which the movable body is provided with an inclined recess portion.

In a modification of the movable body 17 shown in FIG. 28, a shallow recess and an inclined surface 170 in rear of the shallow recess are formed at a location for contact with the end portion 70 of the trigger lever 16. A rear portion of the inclined surface 170 is elevated. The end portion 70 of the lever 16 is placed on a lower portion of the inclined surface 170. Thus, forward movement of the movable body 17 is prevented at times other than the time of collision. A gap 133 is provided between the trigger lever 16 and lock arm 13. The gap 133 is greater than a height h between the lower and higher portions of the inclined surface 170 so that the end portion 70 of the trigger lever 16 can rise by a height of a rear end 170a of the inclined surface 170.

Figure 29:
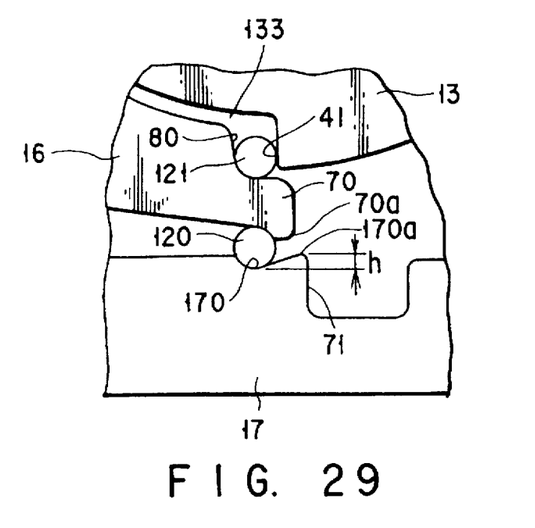
FIG. 29 is a side view showing a modification in which the movable body is provided with an inclined recess portion and a roller.

In a modification shown in FIG. 29, a rotatable roller 120 is provided between the end portion 70 of the trigger lever 16 and the movable body 17. In addition, a rotatable roller 121 is provided between the end portion 70 and the stopper wall 41 of the lock arm 13. Like the modification in FIG. 28, a shallow recess and an inclined surface 170 in rear of the shallow recess are formed on the movable body 17 in front of a recess 71. The roller 120 is put in contact with a lower portion of the inclined surface 170. A terminal portion 70a of the end portion 70 of the lever 16 slightly projects downwards in rear of the roller 120, thereby preventing the roller 120 from moving rearwards beyond the terminal portion 70a. A gap 133 is provided between the trigger lever 16 and lock arm 13. The gap 133 is greater than a height h between the lower and higher portions of the inclined surface 170 so that the end portion 70 of the trigger lever 16 can rise by a height of a rear end 170a of the inclined surface 170. By virtue of the rearwardly elevated inclined surface 170, the movable body 17 is surely held in the first position at times other than the time of collision.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A seat belt tightening device mounted on a seat belt support structure of a vehicle, said device comprising:

a base bracket fixed on said support structure and having a horizontally extending main shaft;

a lock arm rotatable between a normal position in which the lock arm is set in a higher position and a tightened position in which the lock arm is set in a lower position, with one end portion of the lock arm rotatably centering around said main shaft, said lock arm having a coupling portion to be coupled to a seat belt support member for supporting a seat belt and having a stopper wall extending radially outward of the main shaft;

urging means for producing a torque for rotating the lock arm towards said tightened position;

a movable body provided on said base bracket to be movable between a first position and a second position, said movable body moving from the first position to the second position at a time of a collision;

a horizontal support shaft provided on said base bracket;

a trigger lever being swingable on said support shaft and having an end portion and an engaging portion, a part of the trigger lever which is closer to the end portion being situated between said lock arm and said movable body, the end portion being supported by the movable body when the movable body is in the first position, whereby engagement between the engaging portion and the stopper wall is maintained and the lock arm is set in said normal position, and the end portion ceasing to be supported by the movable body when the movable body has moved to the second position, whereby the engagement between the engaging portion and the stopper wall is released and the lock arm is permitted to rotate towards the tightened position;

reverse motion preventing teeth provided on said base bracket along an arc defined around said main shaft;

a shaft member provided at another end portion of the lock arm; and a ratchet rotatably provided around said shaft member and having a distal-end claw portion engageable with said reverse motion preventing teeth, said claw portion being directed rearwards with respect to a rotational direction of the lock arm while the lock arm is being rotated towards the tightened position, and said claw portion being moved in a direction to engage the reverse motion preventing teeth while the lock arm is being rotated towards the normal position.

2. The seat belt tightening device according to claim 1, wherein said urging means is a spiral spring wound around said main shaft and having an outer end portion and an inner end portion, said outer end portion being engaged with said base bracket, and said inner end portion being engaged with said main shaft.

3. The seat belt tightening device according to claim 1, wherein said support shaft, on which said trigger lever rotates, is set off upwards from a location where said lock arm engages said trigger lever, the end portion of the trigger lever extends downwards on a lower side of the lock arm and faces an upper surface of the movable body, and the stopper wall of the lock arm abuts upon the engaging portion of the trigger lever in a state in which the end portion of the trigger lever is supported on the upper surface of the movable body, whereby a resilient force of said urging means acts via the stopper wall and the engaging portion to urge the end portion of the trigger lever onto the movable member.

4. The seat belt tightening device according to claim 1, wherein said reverse motion preventing teeth are provided on an outer peripheral edge portion of the base bracket, and a front portion of the ratchet is provided with a projection for preventing the ratchet from rotating in a direction to run over the reverse motion preventing teeth while the lock arm being rotated towards the normal position.

5. The seat belt tightening device according to claim 1, further comprising a torque producing spring for urging the end portion of the trigger lever onto an upper surface of the movable body.

6. The seat belt tightening device according to claim 1, further comprising a spring for urging the movable body backwards.

7. The seat belt tightening device according to claim 1, wherein said base bracket has a double frame structure including a main frame which has a through-hole and a sub-frame raised in parallel to the main frame, the movable body being housed between a lower part of the main frame and a lower part of the sub-frame, and the end portion of the trigger lever passes through the through-hole, projects into the inside of-the base bracket and is supported on an upper side of the movable body.

8. The seat belt tightening device according to claim 1, wherein the lock arm has a double plate structure including a main arm and a sub-arm arranged substantially in parallel to each other, said arm has a shaft member for coupling end portions of the main arm and the sub-arm, and said seat belt support member is connected to the shaft member.

9. The seat belt tightening device according to claim 1, wherein said movable body has a cylindrical shape and the end portion of the trigger lever is put in contact with an outer peripheral surface of said cylindrical movable body.

10. The seat belt tightening device according to claim 1, further comprising:

holders for holding said movable body movably in a back-and-forth direction;

rollers provided between bottom surfaces of the holders and said movable body, said rollers enabling said movable body to be supported movably in the back-and-forth direction; and backward motion preventing means, provided on said bottom surfaces, for preventing the movable body from moving backwards from the first position.

11. The seat belt tightening device according to claim 10, further comprising a spring for urging the movable body backwards.

12. The seat belt tightening device according to claim 1, wherein said trigger lever has an extended portion extended to the vicinity of a rear end of the movable body, and an end portion of the extended portion is supported on an upper surface of the movable body near the rear end of the movable body, whereby the end portion of the extended portion falls behind the rear end of the movable body when the movable body has moved from the first position to the second position.

13. The seat belt tightening device according to claim 1, wherein rotatable rollers are attached to shafts provided on a bottom portion of the base bracket, said rollers enabling the movable body to move in a back-and-forth direction.

14. The seat belt tightening device according to claim 13, further comprising a spring for urging the movable body backwards.

15. The seat belt tightening device according to claim 1, further comprising:

holders for holding the movable body movably in a back-and-forth direction; and sheet-like low-frictional members with a low friction coefficient, provided at least between a lower surface of the movable body and bottom surfaces of said holders, for smoothing back-and-forth movement of the movable body.

16. The seat belt tightening device according to claim 15, further comprising a spring for urging the movable body backwards.

17. The seat belt tightening device according to claim 1, wherein a rearwardly elevated inclined surface is formed on an upper surface of the movable body, a lower portion of the inclined surface being put in contact with the end portion of the trigger lever, and a gap is provided between an upper surface of the end portion of the trigger lever and the lock arm, the gap being greater than a height between the lower portion and a higher portion of the inclined surface.

18. The seat belt tightening device according to claim 1, wherein a rearwardly elevated inclined surface is formed on an upper surface of the movable body, a rotatable roller is provided between a lower portion of the inclined surface and the end portion of the trigger lever, and a gap is provided between an upper surface of the end portion of the trigger lever and the lock arm, the gap being greater than a height between lower and higher portions of the inclined surface.

19. The seat belt tightening device according to claim 1, further comprising a rotatable roller provided between the stopper wall of the lock arm and the engaging portion of the trigger lever.

* * * * *